United States Patent [19]
Olarig

[11] Patent Number: 5,923,860
[45] Date of Patent: Jul. 13, 1999

[54] APPARATUS, METHOD AND SYSTEM FOR REMOTE PERIPHERAL COMPONENT INTERCONNECT BUS USING ACCELERATED GRAPHICS PORT LOGIC CIRCUITS

[75] Inventor: Sompong P. Olarig, Cypress, Tex.

[73] Assignee: Compaq Computer Corp., Houston, Tex.

[21] Appl. No.: 08/882,090

[22] Filed: Jun. 25, 1997

Related U.S. Application Data

[51] Int. Cl.$^6$ ..................................................... G06F 13/00
[52] U.S. Cl. ........................... 395/309; 395/284; 395/828
[58] Field of Search ..................................... 395/306, 308, 395/309, 284, 828

[56] References Cited

U.S. PATENT DOCUMENTS

| | | | |
|---|---|---|---|
| 5,555,383 | 9/1996 | Elazar et al. | 395/306 |
| 5,754,807 | 5/1998 | Lambrecht et al. | 395/308 |
| 5,768,612 | 6/1998 | Nelson | 395/800.32 |

*Primary Examiner*—Glenn A. Auve
*Attorney, Agent, or Firm*—Paul N. Katz; Ronald L. Chichester; Frohwitter

[57] ABSTRACT

A multiple use core logic chip set is provided in a computer system that may be configured either as a bridge between an accelerated graphics port ("AGP") bus and host and memory buses, as a bridge between a remote peripheral component interconnect ("remote-PCI") bus and the host and memory buses, or as a bridge between a primary PCI bus and the remote-PCI bus. The function of the multiple use chip set is determined at the time of manufacture of the computer system or in the field whether an AGP bus bridge or a remote-PCI bus bridge is to be implemented. Selection of the type of bus bridge (AGP or remote-PCI) in the multiple use core logic chip set may be made by a hardware signal input, or by software during computer system configuration or power on self test ("POST"). Software configuration may also be determined upon detection of either an AGP or a remote-PCI device connected to the common AGP/remote-PCI bus.

36 Claims, 10 Drawing Sheets

APPARATUS, METHOD AND SYSTEM FOR REMOTE PERIPHERAL COMPONENT INTERCONNECT BUS USING ACCELERATED GRAPHICS PORT LOGIC CIRCUITS

CROSS REFERENCE TO RELATED PATENT APPLICATION

This patent application is related to commonly owned U.S. Pat. application Ser. No. 08/853,289, filed May 9, 1997, entitled "Dual Purpose Apparatus, Method And System For Accelerated Graphics Port And Peripheral Component Interconnect" by Ronald T. Horan and Sompong P. Olarig, and is hereby incorporated by reference.

BACKGROUND OF THE INVENTION

1. Field of the Invention

The present invention relates to computer systems using core logic circuits as a bus bridge(s) to interface a central processor(s), video graphics processor, memory and input-output peripherals together, and more particularly, in utilizing the same core logic circuits as a bus bridge for either an accelerated graphics port or a remote peripheral component interconnect bus.

2. Description of the Related Technology

Use of computers, especially personal computers, in business and at home is becoming more and more pervasive because the computer has become an integral tool of most information workers who work in the fields of accounting, law, engineering, insurance, services, sales and the like. Rapid technological improvements in the field of computers have opened up many new applications heretofore unavailable or too expensive for the use of older technology mainframe computers. These personal computers may be used as stand-alone workstations (high end individual personal computers) or linked together in a network by a "network server" which is also a personal computer which may have additional features specific to its purpose in the network. The network server may be used to store massive amounts of data, and may facilitate interaction of the individual workstations connected to the network for electronic mail ("E-mail"), document databases, video teleconferencing, whiteboarding, integrated enterprise calendar, virtual engineering design and the like. Multiple network servers may also be interconnected by local area networks ("LAN") and wide area networks ("WAN").

A significant part of the ever increasing popularity of the personal computer, besides its low cost relative to just a few years ago, is its ability to run sophisticated programs and perform many useful and new tasks. Personal computers today may be easily upgraded with new peripheral devices for added flexibility and enhanced performance. A major advance in the performance of personal computers (both workstation and network servers) has been the implementation of sophisticated peripheral devices such as video graphics adapters, local area network interfaces, SCSI bus adapters, full motion video, redundant error checking and correcting disk arrays, and the like. These sophisticated peripheral devices are capable of data transfer rates approaching the native speed of the computer system microprocessor central processing unit ("CPU"). The peripheral devices' data transfer speeds are achieved by connecting the peripheral devices to the microprocessor(s) and associated system random access memory through high speed expansion local buses. Most notably, a high speed expansion local bus standard has emerged that is microprocessor independent and has been embraced by a significant number of peripheral hardware manufacturers and software programmers. This high speed expansion bus standard is called the "Peripheral Component Interconnect" or "PCI." A more complete definition of the PCI local bus may be found in the PCI Local Bus Specification, revision 2.1; PCI/PCI Bridge Specification, revision 1.0; PCI System Design Guide, revision 1.0; and PCI BIOS Specification, revision 2.1, the disclosures of which are hereby incorporated by reference. These PCI specifications are available from the PCI Special Interest Group, P.O. Box 14070, Portland, Oreg. 97214.

A computer system has a plurality of information (data and address) buses such as a host bus, a memory bus, at least one high speed expansion local bus such as the PCI bus, and other peripheral buses such as the Small Computer System Interface (SCSI), Extension to Industry Standard Architecture (EISA), and Industry Standard Architecture (ISA). The microprocessor(s) of the computer system communicates with main memory and with the peripherals that make up the computer system over these various buses. The microprocessor(s) communicates to the main memory over a host bus to memory bus bridge. The peripherals, depending on their data transfer speed requirements, are connected to the various buses which are connected to the microprocessor host bus through bus bridges that detect required actions, arbitrate, and translate both data and addresses between the various buses.

Increasingly sophisticated microprocessors have revolutionized the role of the personal computer by enabling complex applications software to run at mainframe computer speeds. The latest microprocessors have brought the level of technical sophistication to personal computers that, just a few years ago, was available only in mainframe and mini-computer systems. Some representative examples of these new microprocessors are the "PENTIUM" and "PENTIUM PRO" (registered trademarks of Intel Corporation). Advanced microprocessors are also manufactured by Advanced Micro Devices, Digital Equipment Corporation, Cyrix, IBM and Motorola.

These sophisticated microprocessors have, in turn, made possible running complex application programs using advanced three dimensional ("3-D") graphics for computer aided drafting and manufacturing, engineering simulations, games and the like. Increasingly complex 3-D graphics require higher speed access to ever larger amounts of graphics data stored in memory. This memory may be part of the video graphics processor system, but, preferably, would be best (lowest cost) if part of the main computer system memory. Intel Corporation has proposed a low cost but improved 3-D graphics standard called the "Accelerated Graphics Port" (AGP) initiative. With AGP 3-D, graphics data, in particular textures, may be shifted out of the graphics controller local memory to computer system memory. The computer system memory is lower in cost than the graphics controller local memory and is more easily adapted for a multitude of other uses besides storing graphics data.

The proposed Intel AGP 3-D graphics standard defines a high speed data pipeline, or "AGP bus," between the graphics controller and system memory. This AGP bus has sufficient bandwidth for the graphics controller to retrieve textures from system memory without materially affecting computer system performance for other non-graphics operations. The Intel 3-D graphics standard is a specification which provides signal, protocol, electrical, and mechanical specifications for the AGP bus and devices attached thereto. This specification is entitled "Accelerated Graphics Port Interface Specification Revision 1.0," dated Jul. 31, 1996, the disclosure of which is hereby incorporated by reference.

The AGP interface specification uses the 66 MHz PCI (Revision 2.1) as an operational baseline, with three performance enhancements to the PCI specification which are used to optimize the AGP specification for high performance 3-D graphics applications. These enhancements are: 1) pipelined memory read and write operations, 2) demultiplexing of address and data on the AGP bus by use of sideband signals, and 3) data transfer rates in excess of 500 megabytes per second ("MB/sec.") using the AGP 2x mode. The remaining AGP specification does not modify the PCI 2.1 Specification, but rather provides a range of graphics-oriented performance enhancements for use by the 3-D graphics hardware and software designers. The AGP specification is neither meant to replace nor diminish full use of the PCI standard in the computer system. The AGP specification creates an independent and additional high speed local bus for use by 3-D graphics devices such as a graphics controller, wherein the other input-output ("I/O") devices of the computer system may remain on any combination of the PCI, SCSI, EISA and ISA buses.

To functionally enable this AGP 3-D graphics bus, new computer system hardware and software are required. This requires new computer system core logic designed to function as a host bus/memory bus/PCI bus to AGP bus bridge meeting the AGP specification, and new Read Only Memory Basic Input Output System ("ROM BIOS") and Application Programming Interface ("API") software to make the AGP dependent hardware functional in the computer system. The computer system core logic must still meet the PCI standards referenced above and facilitate interfacing the PCI bus(es) to the remainder of the computer system. This adds additional costs to a personal computer system, but is well worth it if 3-D graphics are utilized. Some personal computer uses such as a network server do not require 3-D graphics, but would greatly benefit from having a remote-PCI bus with multiple PCI card slots for accepting additional input-output devices such as a network interface card(s) ("NIC"), PCI/PCI bridge, PCI/SCSI adapter, PCI/EISA/ISA bridge, a wide area network digital router, multiple head graphics, and the like.

AGP and PCI devices serve different purposes and the respective interface cards (e.g., AGP 3-D video controller and PCI NIC) are not physically or electrically interchangeable even though there is some commonality of signal functions between the AGP and PCI interface specifications. While AGP capabilities are very desirable in a personal computer utilizing 3-D graphics, it is wasteful and redundant for those personal computers not requiring 3-D capabilities. The cost/performance (i.e., flexibility of the computer for a given price) of a personal computer is of paramount importance for commercial acceptance in the market place. In today's competitive computer industry, technical performance alone does not guarantee commercial success. Technical performance of any personal computer product must be maximized while constantly reducing its manufacturing costs. To achieve a high performance to cost ratio, commonality of components and high volume of use are key factors. Thus, commonality of components such as logic circuits, printed circuit boards, microprocessors, computer boxes and power supplies, will drive the costs down for both workstations and servers. Also the high end workstations and network servers would benefit if one generic model of a personal computer could be effectively used in either capacity. Further benefits in reducing costs may be realized by using common components in portable and desktop (consumer and low end business) computers.

Faster and more sophisticated microprocessors are here now or will soon be introduce in the near future. The Digital Equipment Corporation "ALPHA" processor runs in excess of 400 MHz and the still in development, Intel Corporation's 64 bit data and address bus width processors (code name Merced) will soon be available for use in high end computer servers. The ultra high performance Alpha and Merced processors require a great deal of power to operate and thus generate large amounts of heat relative to present technology processors. In addition, multi-processor configurations of up to eight processors in a computer system further taxes the physical, electrical and thermal packaging of these future super microcomputers. A solution to packaging may require these new processors to occupy their own box with the necessary power supplies and cooling, but without room or capacity for other components necessary to make up a complete computer system. Gigabyte memory and a significant number of external and internal I/O PCI devices and slots may require separate chassis(es) apart from the processor(es) chassis. Thus, remote-PCI has a distinct advantage for more efficient and flexible computer system packaging.

What is needed is an apparatus, method, and system for a personal computer that may provide a remote-PCI bus when an AGP bus is not needed by utilizing multiple use high production volume logic and interface circuits having the capability of providing either a remote-PCI or an AGP interface.

OBJECTS OF THE INVENTION

It is therefore an object of the present invention to provide a core logic chip set configurable for a remote-PCI bus when an AGP bus is not needed by utilizing multiple use high production volume logic and interface circuits having the capability of providing either a remote-PCI or an AGP interface.

It is a further object of the present invention to provide a core logic chip set that may be used in a personal computer system for an additional PCI bus when an AGP bus is not needed by utilizing multiple use high production volume logic and interface circuits having the capability of providing either a remote-PCI bus or an AGP bus interface, and using a PCI to remote-PCI bridge to provide for a PCI bus remote from the main computer system.

It is another object to use an arbiter of the multiple use high production volume logic and interface circuits for either an AGP device or a plurality of remote-PCI devices.

It is a further object of the present invention to provide a method and system for programming a core logic chip set to be a bridge between a remote-PCI bus and the host and memory buses.

It is another object to use an arbiter in the remote-PCI bus bridge for arbitration of a plurality of PCI devices on the remote-PCI bus.

It is yet a further object to provide additional request and grant lines for each PCI card slot and PCI device connected to the remote-PCI bus.

SUMMARY OF THE INVENTION

The above and other objects of the present invention are satisfied, at least in part, by providing in a computer system a multiple use core logic chip set that may be configured as either a bridge between an AGP bus and host and memory buses, or as an interface between the host and memory buses and a remote-PCI bus bridge. The function of the multiple use chip set is determined at the time of manufacture of the computer system or may be changed in the field to an AGP bus bridge or an interface for a remote-PCI bus bridge. The core logic chip set has provisions for the AGP and remote-PCI interface signals and is adapted for connection to either the AGP bus or the remote-PCI bus bridge interface. Selection of which configuration (AGP or remote-PCI bridge interface) the core logic of the present invention is to assume may be determined by the type of computer system printed circuit motherboard utilized with the core logic chip set or by software configuration during computer system startup (POST) or configuration. The core logic chip set of the present invention uses one of its arbiters and has Request ("REQ") and Grant ("GNT") signal lines for the AGP device and each PCI device on the primary PCI bus). The remote-PCI bridge has device REQ and GNT signal lines for each PCI device on the remote-PCI bus.

The remote-PCI bridge interface of the present invention may be configured to connect to an expansion cable which is used to join the core logic chip set on the computer system motherboard to a remote-PCI interface to PCI bus bridge located on a remote expansion box motherboard. The cable passes signals to and from the interface on the computer system motherboard and the interface on the remote expansion box motherboard. One embodiment of the present invention connects the core logic chip set on the computer system motherboard directly to the expansion cable. This embodiment has a built-in cable bus drivers and receivers that may be differentially connected for improved noise rejection. Another embodiment of the present invention connects the core logic chip set to additional PCI bus on the computer system motherboard. A PCI device card having an interface for and connected to the expansion cable is connected to the additional PCI bus either by plugging into a PCI connector or being embedded on the computer system motherboard. The former embodiment of the invention combines the expansion cable interface within the core logic of the present invention. The later embodiment uses an PCI device card having cable bus drivers and receivers for interfacing with the expansion cable. This PCI device card may plug into a PCI bus of the computer system which is connected to the core logic. The core logic is configured as a PCI bus interface by a hardware input signal or software programing, as disclosed above. PCI bus transactions for either of the aforementioned embodiments may be considered for discussion purposes to be the same.

The computer system side of the remote-PCI interface may connect to the computer system primary PCI bus or it may connect to the host bus and act as a part of a host-to-PCI bridge. Either way, a new PCI bus is created having a different bus number than the primary PCI bus. The expansion cable interface at the remote expansion box, in combination with the expansion cable interface in the computer system, creates a PCI bus interface for a downstream PCI bus (either downstream from the primary PCI bus or downstream from the computer system host bus). Hereinafter the interface and logic on the computer system motherboard will be referred to as the "upstream interface and logic" and the interface and logic on the expansion box motherboard will be referred to as the "downstream interface and logic."

The downstream interface and logic generates and drives PCI clocks in the expansion box at the same frequency as the PCI clock of the computer system connected to the upstream interface and logic. Delayed transactions are allowed as more fully defined in the PCI 2.1 Specification. This allows transactions to proceed in both directions at the same time without requiring both upstream and downstream buses to be owned at the same time. Each interface includes queues for buffering both read and write transactions between the upstream and downstream buses. Interrupts are supported by the downstream logic in the expansion box. An arbiter in the downstream logic provides REQ and GNT signal lines for each PCI device in the expansion box. Multiple downstream PCI buses are contemplated as more fully described in the PCI 2.1 Specification. Multiple expansion boxes are also contemplated herein, each with its own downstream interface and logic. Associated upstream interfaces and logic being located in the computer system, and each downstream interface and logic being located in a separate expansion box. Also contemplated are multiple expansion boxes daisy-chained together with upstream and downstream interfaces and logic therebetween. Remote-PCI buses and associated interfaces and logic are more fully described in commonly owned U.S. patent applications Ser. No. 08/658,485, filed Jun. 5, 1996, entitled "Bus Arbitration" by Ramsey et al.; and U.S. Ser. No. 08/658,732, filed Jun. 5, 1996, entitled "Data Error Detection and Correction" by Olarig et al, and both applications are hereby incorporated by reference.

The embodiments of the invention contemplate a multiple use core logic chip set which may be one or more integrated circuit devices such as an Application Specific Integrated Circuit ("ASIC"), Programmable Logic Array ("PLA") and the like. An AGP device may be embedded on the computer system motherboard, or may be on a separate card which plugs into a corresponding AGP card edge connector attached to the system motherboard and connected to the multiple use core logic chip set. The AGP and PCI card edge connectors are standard AGP and PCI connectors as more fully defined in the respective AGP and PCI specifications.

The multiple use core logic chip set of the present invention may be used in conjunction with a specific use printed circuit motherboard for a workstation, personal computer, portable computer, or a network server. In this embodiment, the type of motherboard may be adapted to apply hardware signal inputs to the core logic chip set for determining the configuration (AGP or remote-PCI interface) thereof. The multiple use core logic chip set may also be configured to provide the remote-PCI interface by software selection and is within the scope of the present invention.

An advantage of the present invention is being able to use the same multiple use core logic chip set across different types of computer products. This feature increases the quantity of these chip sets being manufactured, thus resulting in a corresponding decrease in the cost per chip set.

The multiple use core logic chip set of the present invention may be used in conjunction with a multiple use or universal printed circuit motherboard having provisions for either an AGP card connector or a remote-PCI interface connector. The multiple use core logic chip set may also be connected to both an AGP connector and a remote-PCI interface connector on the universal printed circuit motherboard. Thus, one motherboard and core logic chip set can satisfy the requirements for a computer system having either an AGP bus and primary PCI bus, or a primary PCI bus and a remote-PCI bus interface.

Another embodiment of the present invention provides for a combination AGP or additional PCI bus with either or both AGP and PCI connectors attached thereto. A PCI interface card plugs into the additional PCI connector and is used as an interface to the remote-PCI bus bridge. A dual use AGP/PCI bus is disclosed in commonly owned U.S. patent application Ser. No. 08/853,289, filed May 9, 1997, entitled "Dual Purpose Apparatus, Method And System For Accelerated Graphics Port And Peripheral Component Interconnect" by Ronald T. Horan and Sompong P. Olarig, incorporated by reference above.

As discussed above, the multiple use core logic chip set may have signal inputs for configuring whether it functions as an AGP interface or a remote-PCI bridge interface, however, it is also contemplated in the present invention that the multiple use chip set may be software programmed to select either the AGP or the remote-PCI bridge interface function. When the computer system is first powered on and POST begins, the startup configuration software must scan the PCI bus or buses to determine what PCI devices exist and what configuration requirements they may have. This process is commonly referred to as enumerating, scanning, walking or probing the bus. It may also be referred to as the discovery process. The software program which performs the discovery process may be referred to as the PCI bus enumerator.

According to the PCI specification all PCI devices must implement a base set of configuration registers. The PCI device may also implement other required or optional configuration registers defined in the PCI specification. The PCI specification also defines configuration registers and information to be contained therein for a PCI compliant device so as to indicate its capabilities and system requirements. Once the information for all of the bus devices are determined, the core logic may be configured as a remote-PCI bridge interface by the startup software.

An advantage of the present invention is that software may determine at POST whether the AGP or the remote-PCI bus bridge is to be supported by the core logic chip set. This feature makes the core logic chip set of the present invention compatible with any computer system used as a workstation, personal computer, portable, or network server by utilizing the appropriate system motherboard having provisions for the remote-PCI bus.

Other and further objects, features and advantages will be apparent from the following description of presently preferred embodiments of the invention, given for the purpose of disclosure and taken in conjunction with the accompanying drawings.

DETAILED DESCRIPTION OF THE PREFERRED EMBODIMENTS

Figure 1:
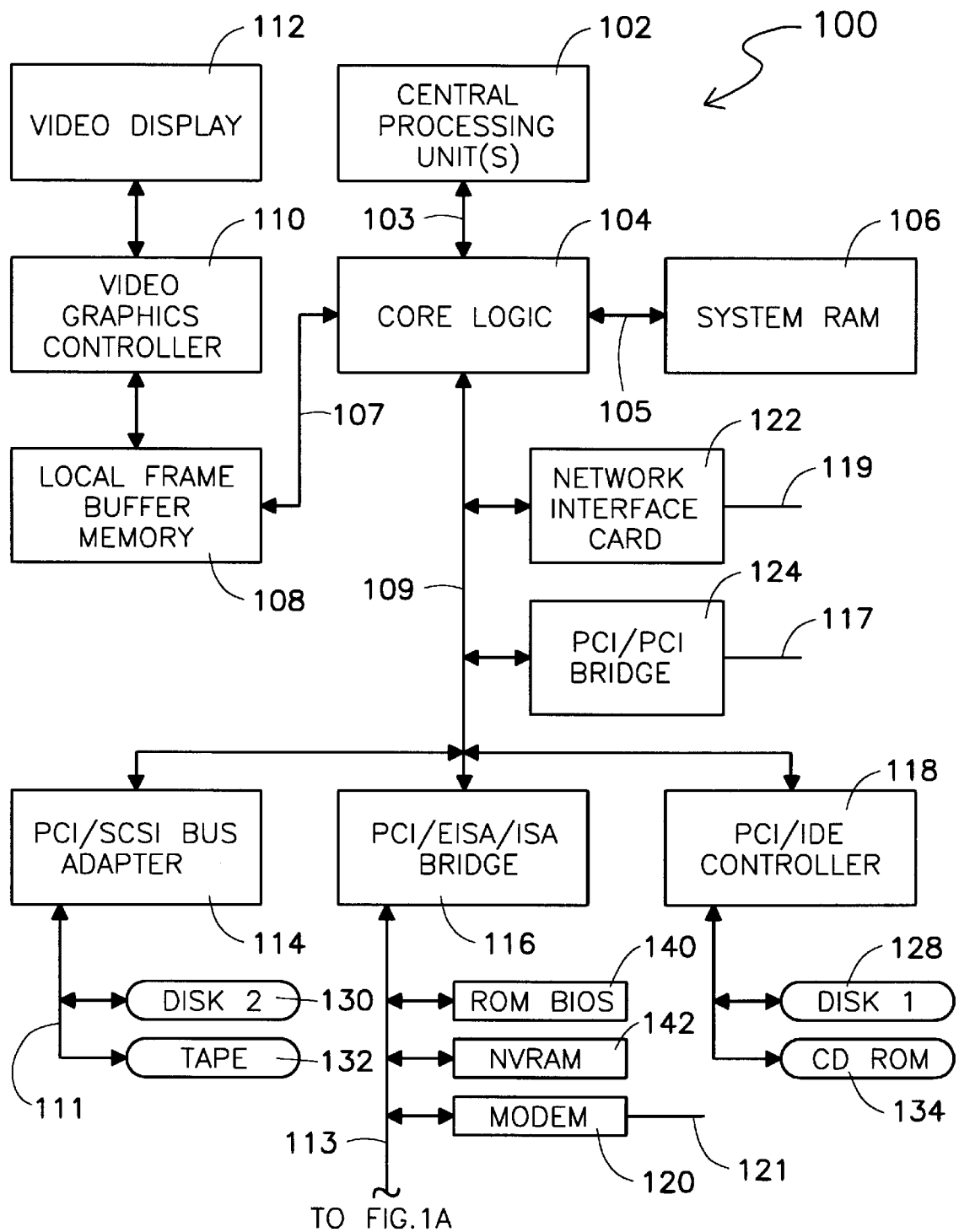
FIGS. 1 and 1A are schematic block diagram of a computer system having a primary PCI bus and an AGP bus.

The present invention is an apparatus, method and system for providing in a computer system a multiple use core logic chip set capable of implementing either a bridge between the host and memory buses and an AGP bus, or a bridge between the host and memory buses and a remote-PCI bus located in an expansion box. Another embodiment of the multiple use core logic chip set of the present invention implements either a bridge between the host and memory buses and an AGP bus, or a bridge between the primary PCI bus and an additional PCI bus, wherein an expansion cable interface configured as a plug-in PCI device card may be connected to the additional PCI bus. Either implementation may be configured by hardware input signals to the multiple use core logic chip set or by software programming thereof.

The AGP bus was developed to have sufficient data bandwidth for a video controller in a computer system, up to 532 megabytes per second ("MB/s"), to run increasingly complex three dimensional ("3-D") graphics applications such as, for example, games and engineering simulations. Not all computer systems, however, need the capability of running 3-D graphics, but would greatly benefit by having an additional PCI bus for NICs, PCI/FCI bridge, PCI/SCSI bridge, and the like. Computers used as network servers require merely simple two dimensional ("2-D") graphics, thus the AGP bus is an overkill for this type of computer.

The AGP interface specification is a derivation or superset of the PCI interface specification and thus shares many common signal functions. Furthermore, the AGP bridge connects to the processor host bus and system memory bus through the computer system core logic chip set, thus it would be desirable to use the chip set logic and driver circuits of the AGP bridge as an interface for a remote-PCI bus. This enhances the versatility of the core logic chip set and reduces the overall cost of computer systems, both workstation and network servers, by having a common multiple use core logic chip set that could be manufactured in large volumes so as to cover all types of computer configurations.

For illustrative purposes preferred embodiments of the present invention are described hereinafter for computer systems utilizing the Intel x86 microprocessor architecture and certain terms and references will be specific to that processor platform. AGP and PCI are interface standards, however, that are hardware independent and may be utilized with any host computer designed for these interface standards. It will be appreciated by those skilled in the art of computer systems that the present invention may be adapted and applied to any computer platform utilizing the AGP and PCI interface standards.

The PCI specifications referenced above are readily available and are hereby incorporated by reference. The AGP specification entitled "Accelerated Graphics Port Interface Specification Revision 1.0," dated Jul. 31, 1996, as referenced above is readily available from Intel Corporation, and is hereby incorporated by reference. Further definition and enhancement of the AGP specification referenced above is more fully defined in "Compaq's Supplement to the 'Accelerated Graphics Port Interface Specification Version 1.0'," Revision 0.8, dated Apr. 1, 1997, and is hereby incorporated by reference. Both of these AGP specifications were included as Appendices A and B in commonly owned co-pending U.S. patent application Ser. Nos. 08/853,289, filed May 9, 1997, entitled "Dual Purpose Apparatus, Method and System for Accelerated Graphics Port and Peripheral Component Interconnect" by Ronald Horan and Sompong P. Olarig, and which is hereby incorporated by reference. A description of remote-PCI bus is disclosed in U.S. Ser. Nos. 08/658,485, filed Jun. 5, 1996, entitled "Bus Arbitration" by Ramsey et al.; and U.S. Ser. No. 08/658,732, filed Jun. 5, 1996, entitled "Data Error Detection and Correction" by Olarig et al., as incorporated by referenced above.

Figure 1A:
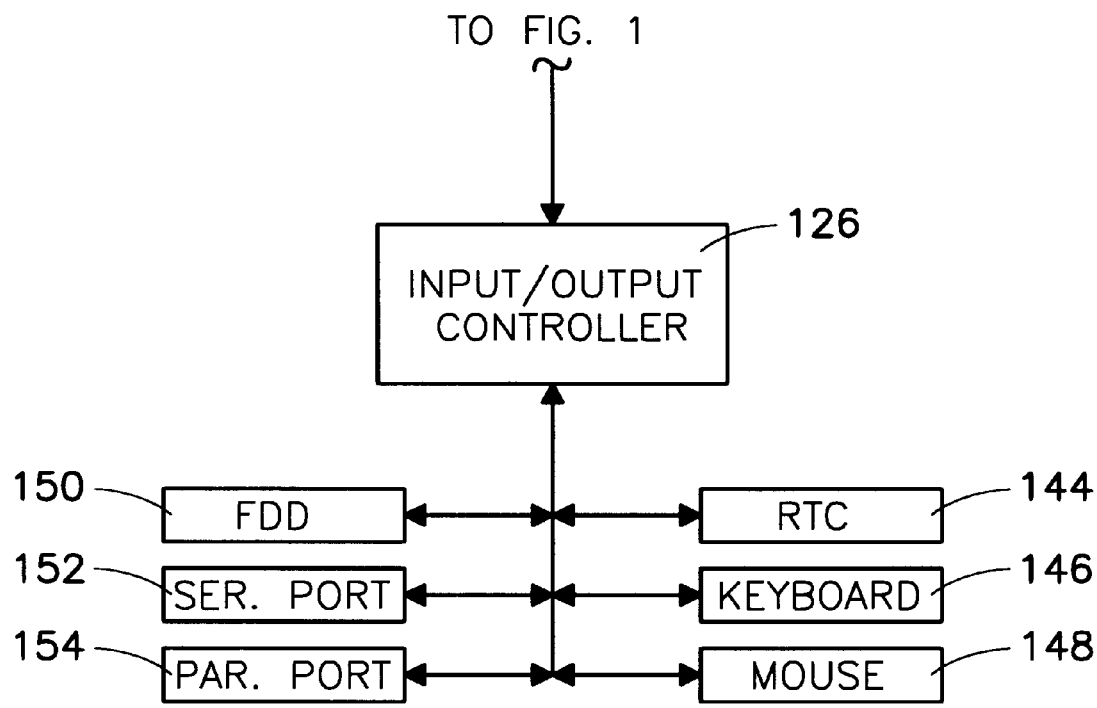

Referring now to the drawings, the details of preferred embodiments of the present invention are schematically illustrated. Like elements in the drawings will be represented by like numbers, and similar elements will be represented by like numbers with a different lower case letter suffix. Referring now to FIGS. 1 and 1A, a schematic block diagram of a computer system utilizing AGP and PCI buses is illustrated. The computer system is generally indicated by the numeral 100 and comprises a central processing unit ("CPU") 102, core logic 104, system random access memory ("RAM") 106, a video graphics controller 110, a local frame buffer memory 108, a video display 112, a PCI/SCSI bus adapter 114, a PCI/EISA/ISA bridge 116, and a PCI/IDE controller 118. Single or multilevel cache memory (not illustrated) may also be included in the computer system 100 according to the current art of microprocessor computers. The CPU 102 may be a plurality of CPUs 102 in a symmetric or asymmetric multi-processor configuration.

Figure 7:
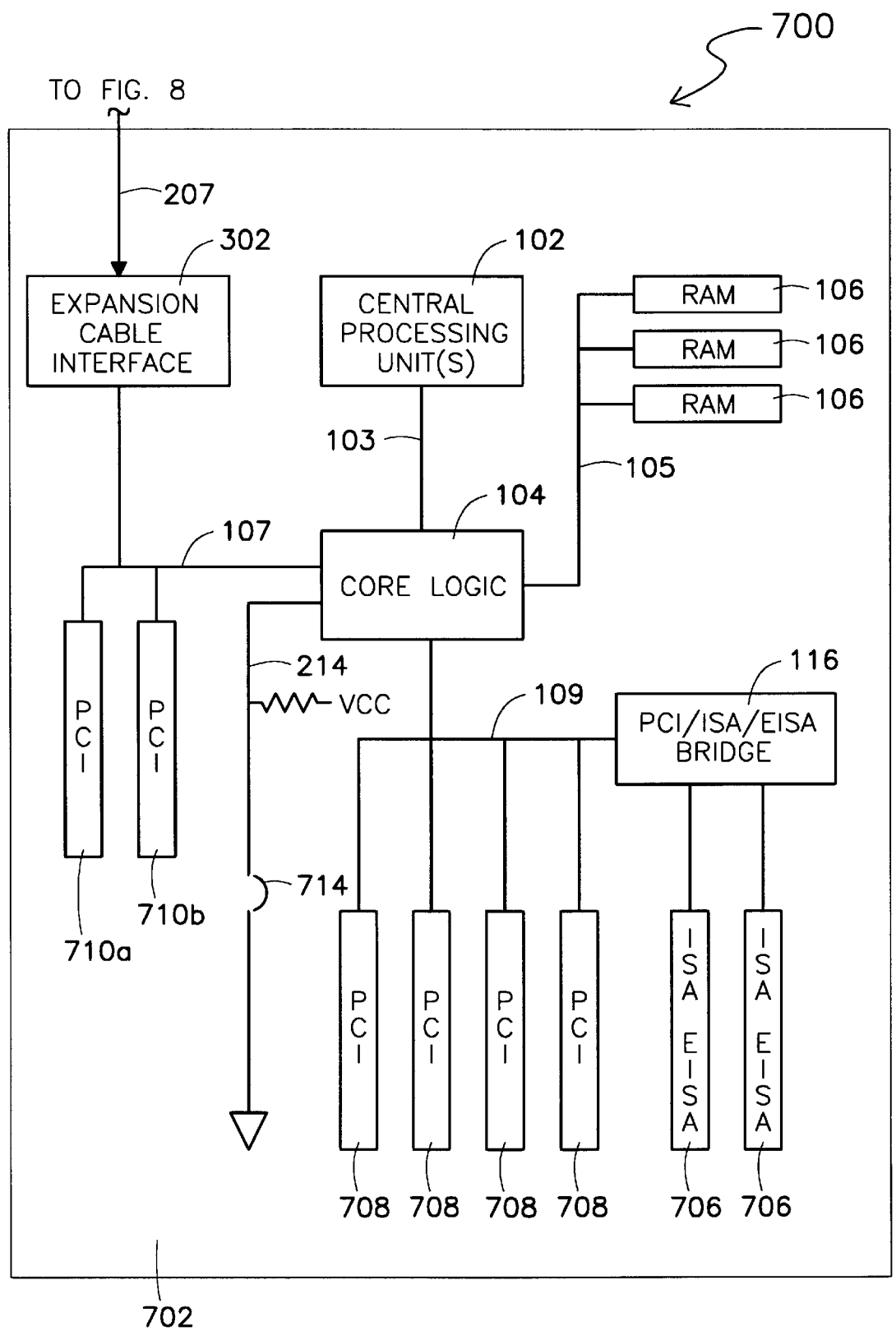
FIG. 7 is schematic plan view of a computer system motherboard, according to the present invention.

The CPU 102 is connected to the core logic 104 through a host bus 103. The system RAM 106 is connected to the core logic 104 through a memory bus 105. The video graphics controller 110 is connected to the local frame buffer memory 108 which is connected to the core logic 104 through an AGP or additional PCI bus 107. The PCI/SCSI bus adapter 114, PCI/EISA/ISA bridge 116, and PCI/IDE controller 118 are connected to the core logic 104 through a PCI bus 109. Also connected to the PCI bus 109 are a network interface card ("NIC") 122, and a PCI/PCI bridge 124. Some of the PCI devices such as the NIC 122 and PCI/PCI bridge 124 may plug into PCI connectors on the computer system 100 motherboard (FIG. 7).

Hard disk 130 and tape drive 132 are connected to the PCI/SCSI bus adapter 114 through a SCSI bus 111. The NIC 122 is connected to a local area network 119. The PCI/EISA/ISA bridge 116 connects over an EISA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive ("FDD") 150, and serial/parallel ports 152, 154. The EISA/ISA bus 113 is a slower information bus than the PCI bus 109, but it costs less to interface with the EISA/ISA bus 113. The PCI/IDE controller 118 interfaces to an IDE disk 128 and IDE CD ROM drive 134.

Figure 2:
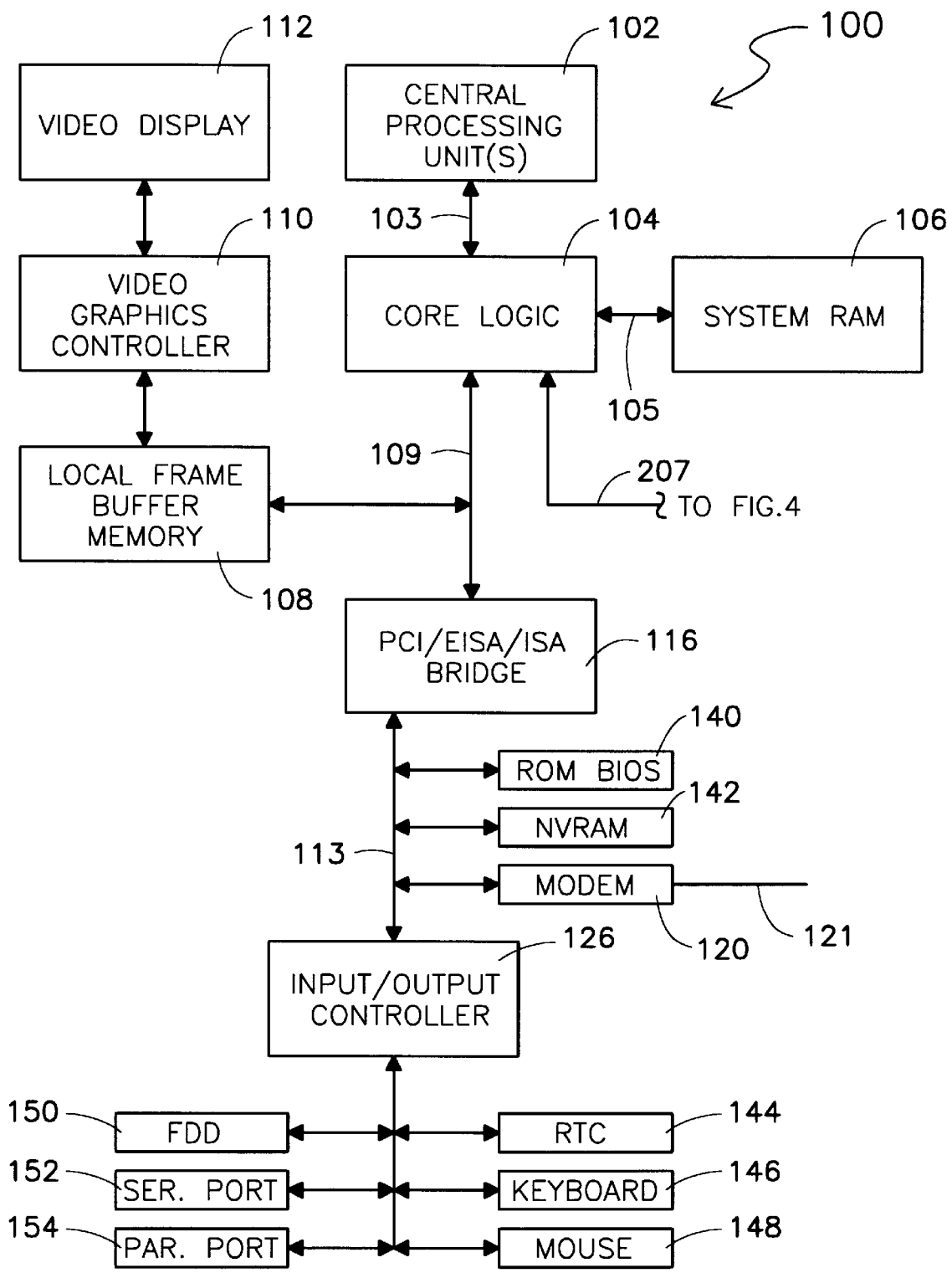
FIG. 2 is a schematic block diagram of a computer system having a primary PCI bus and a remote-PCI interface, according to an embodiment of the present invention.
Figure 4:
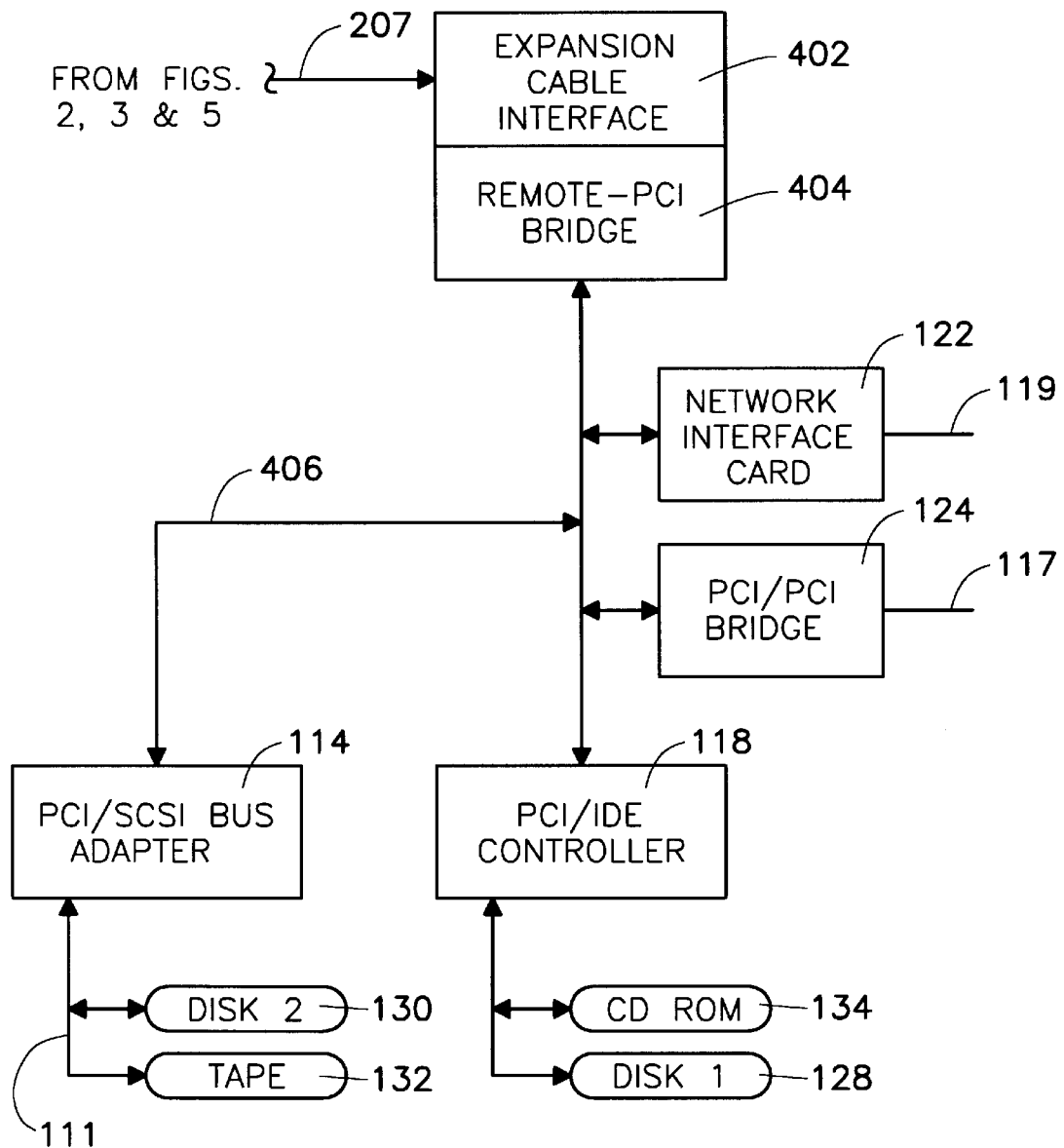
FIG. 4 is a schematic block diagram of an expansion box having a remote-primary PCI bus and a remote-PCI interface as utilized with the computer systems of FIGS. 2 and 3.

Referring now to FIGS. 2 and 4, schematic block diagrams of a computer system having a primary PCI bus on a computer motherboard (see FIG. 7) and a remote-PCI bus on an expansion box motherboard (see FIG. 8) are illustrated. In the embodiment of FIG. 2, the local frame buffer memory 108 is connected to the primary PCI bus 109 and an expansion cable 207 connects to the core logic 104. The core logic 104 may include an expansion cable interface 222 (FIG. 5) having differential cable drivers and receivers (not illustrated) to interface with the expansion cable 207 which may be comprised of a plurality of twisted pairs of insulated wire that are shielded or unshielded. The expansion cable 207 connects to a cable interface 402 on the expansion box motherboard. The cable interface 402 on the expansion box motherboard also has differential cable drivers and receivers and is similar to the expansion cable interface 222 in the core logic 104. In combination with the expansion cable 207 and the expansion cable interfaces 222, 402, all signals necessary for bridging between the additional PCI bus 107 and a remote-PCI bus 406 are included as more fully described in the aforementioned U.S. patent application Ser. Nos. 08/658,485 and 08/658,732, incorporated by reference above. A remote-PCI bridge 404 is connected to the expansion cable interface 402. The remote-PCI bridge 404 is connected to the remote-PCI bus 406 and peripheral devices, as described above, are connected to this remote-PCI bus 406.

Figure 3:
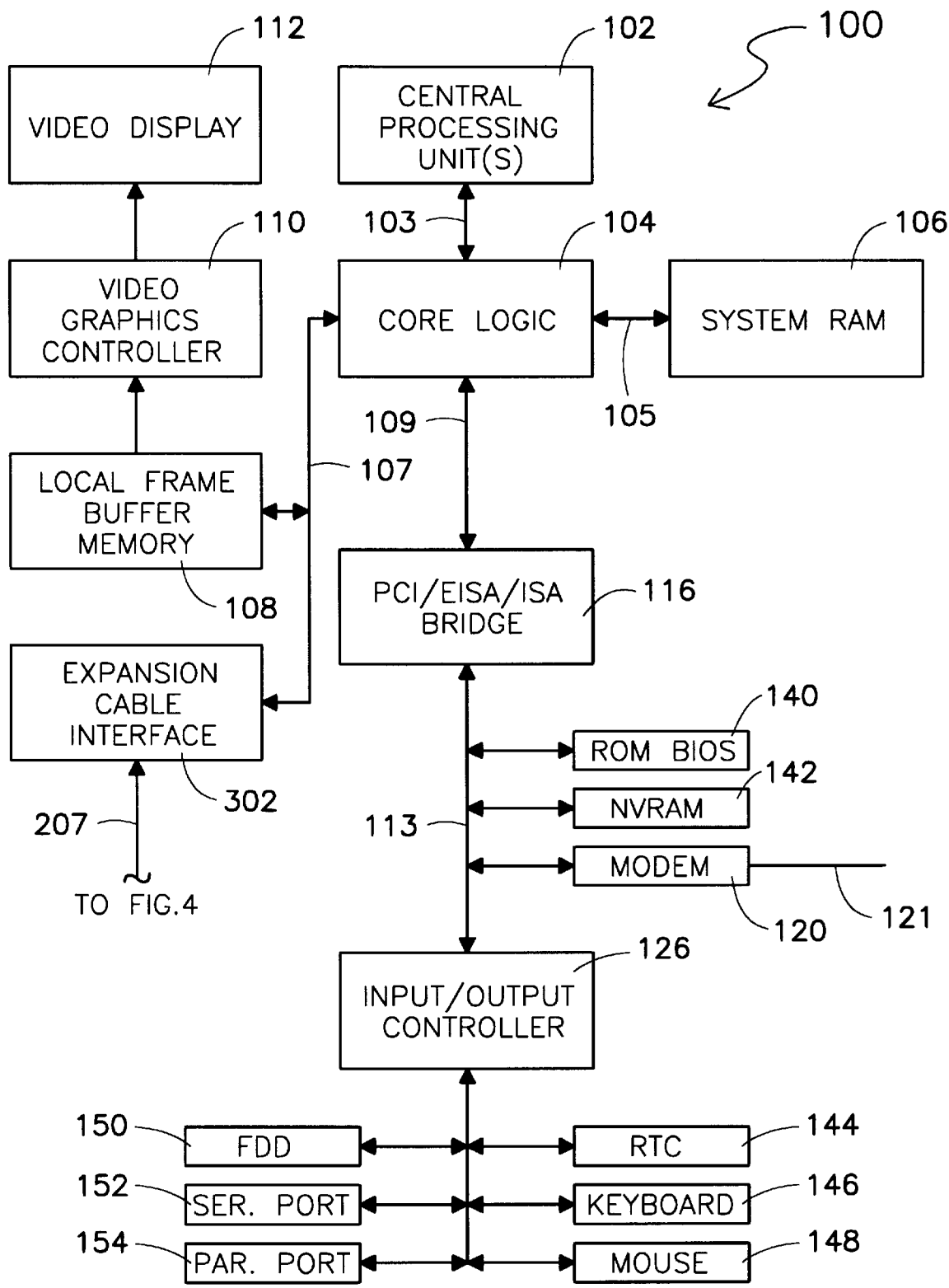
FIG. 3 is a schematic block diagram of a computer system having a primary PCI bus, and additional PCI bus and a remote-PCI interface, according to another embodiment of the present invention.

Referring now to FIG. 3, a schematic block diagram of a computer system having a primary PCI bus 109 and an additional PCI bus 107 is illustrated. The core logic 104 is configured for the PCI buses 109, 107. A separate PCI device card having an expansion cable interface 302 thereon may be plugged into either of these PCI buses 109, 107 (connection to PCI bus 107 is illustrated). Operation of this embodiment of the invention is the same as described above for the embodiment illustrated in FIG. 2, except that the interface for the expansion cable 207 is on the PCI card 302 and not in the core logic 104.

Figure 5:
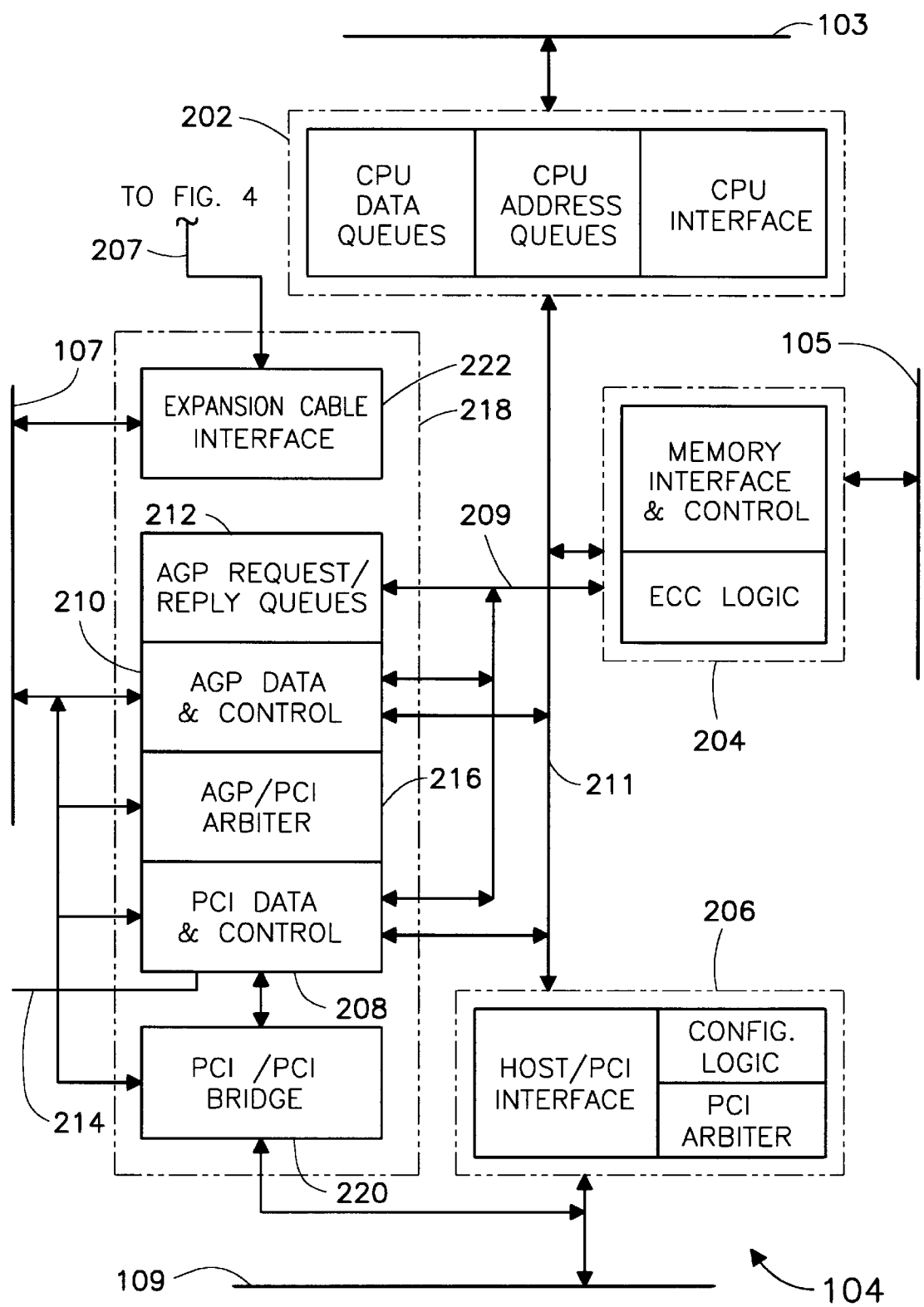
FIG. 5 is a schematic functional block diagram of the embodiments illustrated in FIGS. 2 and 3.

Referring now to FIG. 5, a schematic functional block diagram of the core logic 104 of FIGS. 2 and 3, according to the present invention, is illustrated. The core logic 104 functionally comprises a CPU host bus interface and queues 202, memory interface and control 204, host/PCI bridge 206, and AGP/PCI logic 218. The AGP/PCI logic 218 comprises PCI data and control 208, AGP/PCI arbiter 216, AGP data and control 210, and AGP request/reply queues 212. The CPU host bus interface and queues 202 connects to the host bus 103 and includes interface logic for all data, address and control signals associated with the CPU 102 of the computer system 100. Multiple CPUs 102 and cache memory (not illustrated) are contemplated and within the scope of the present invention. The CPU host bus interface and queues 202 interfaces with the host/PCI bridge 206 and memory interface and control 204 over a core logic bus 211. The CPU host bus interface and queues 202 interfaces with the PCI data and control 208, AGP data and control 210, and AGP request/reply queues 212 over a core logic bus 211. The memory interface and control 204 interfaces with the PCI data and control 208, AGP data and control 210, and AGP request/reply queues 212 over a core logic bus 209. An advantage of having individual core buses 209 and 211 is that concurrent bus operations may be performed thereover. For example, video data stored in system RAM 106 may be transferring to the video graphics controller 110 (AGP device) while the CPU 102 on the host bus 103 is accessing an independent PCI device (i.e., NIC 122) on the PCI bus 109.

The host bus interface and queues 202 allows the CPU 102 to pipeline cycles and schedule snoop accesses. The memory interface and control 204 controls the control and timing signals for the computer system RAM 106 which may be synchronous dynamic RAM and the like. The memory interface and control 204 has an arbiter (not illustrated) which selects among memory accesses for CPU writes, CPU reads, PCI writes, PCI reads, AGP reads, AGP writes, and dynamic memory refresh. Arbitration may be pipelined into a current memory cycle, which insures that the next memory address is available on the memory bus 105 before the current memory cycle is complete. This results in minimum delay, if any, between memory cycles. The memory interface and control 204 also is capable of reading ahead on PCI initiator reads when a PCI initiator issues a read multiple command, as more fully described in the PCI 2.1 Specification.

The host/PCI bridge 206 controls the interface to the PCI bus 109. When the CPU 102 accesses the PCI bus 109, the host/PCI bridge 206 operates as a PCI initiator. When a PCI device is an initiator on the PCI bus 109, the host/PCI bridge 206 operates as a PCI target. The host/PCI bridge 206 contains base address registers for an AGP device target (not illustrated).

The AGP/PCI logic 218 comprises a PCI/PCI bridge 220, PCI data and control 208, AGP/PCI arbiter 216, AGP data and control 210, and AGP request/reply queues 212. The PCI data and control 208, AGP data and control 210, and AGP request/reply queues 212 interface to a AGP/PCI bus 107 having signal, power and ground connections (not illustrated) for implementation of the AGP interface standard or the PCI standard. An AGP/PCI control 214 may be used to select the personality function of the AGP/PCI logic 218 to be an AGP compliant interface or to be a PCI compliant interface, depending on the desired purpose of the computer system 100. The AGP/PCI control 214 may be implemented in hardware (jumper straps) or through software (configuration of personality registers in 208, 210 and 212). These personality registers are more fully defined in the AGP specifications incorporated herein by reference. The AGP/PCI bus 107 is adapted to connect to either a standard AGP connector or standard PCI connectors as more fully described herein below.

The PCI/PCI bridge 220 is connected between the PCI bus 109 and the PCI data and control 208. The PCI/PCI bridge 220 allows existing enumeration code (unmodified) to recognize and handle AGP or PCI compliant devices residing on the AGP/PCI bus 107. The PCI/PCI bridge 220, for example, may be used in determining whether an AGP device or a PCI device is connected to the AGP/PCI bus 107 by bus enumeration during POST.

The AGP/PCI logic 218 may function as a host/PCI bridge or the PCI/PCI bridge 220 may be used for PCI transactions on the AGP/PCI bus 107. In the first case (host/PCI bridge), the AGP/PCI logic 218 becomes a second host/PCI bridge and the AGP/PCI bus 107 becomes a second PCI/host bus in the computer system. The PCI bus 109 is the primary PCI bus and is assigned a logical PCI bus number of zero. The AGP/PCI bus 107 may be assigned a logical PCI bus number of one.

In another embodiment when the AGP/PCI bus 107 is serving as an additional PCI bus, the PCI/PCI bridge 220 in combination with AGP/PCI logic 218 may be used as a full function PCI/PCI bridge between the PCI bus 109 and the AGP/PCI bus 107. In this embodiment of the present invention, transactions between the host bus 103 and the AGP/PCI bus 107 would have to go through both the host/PCI bridge 206 and the now fully functional PCI/PCI bridge 220.

Figure 6:
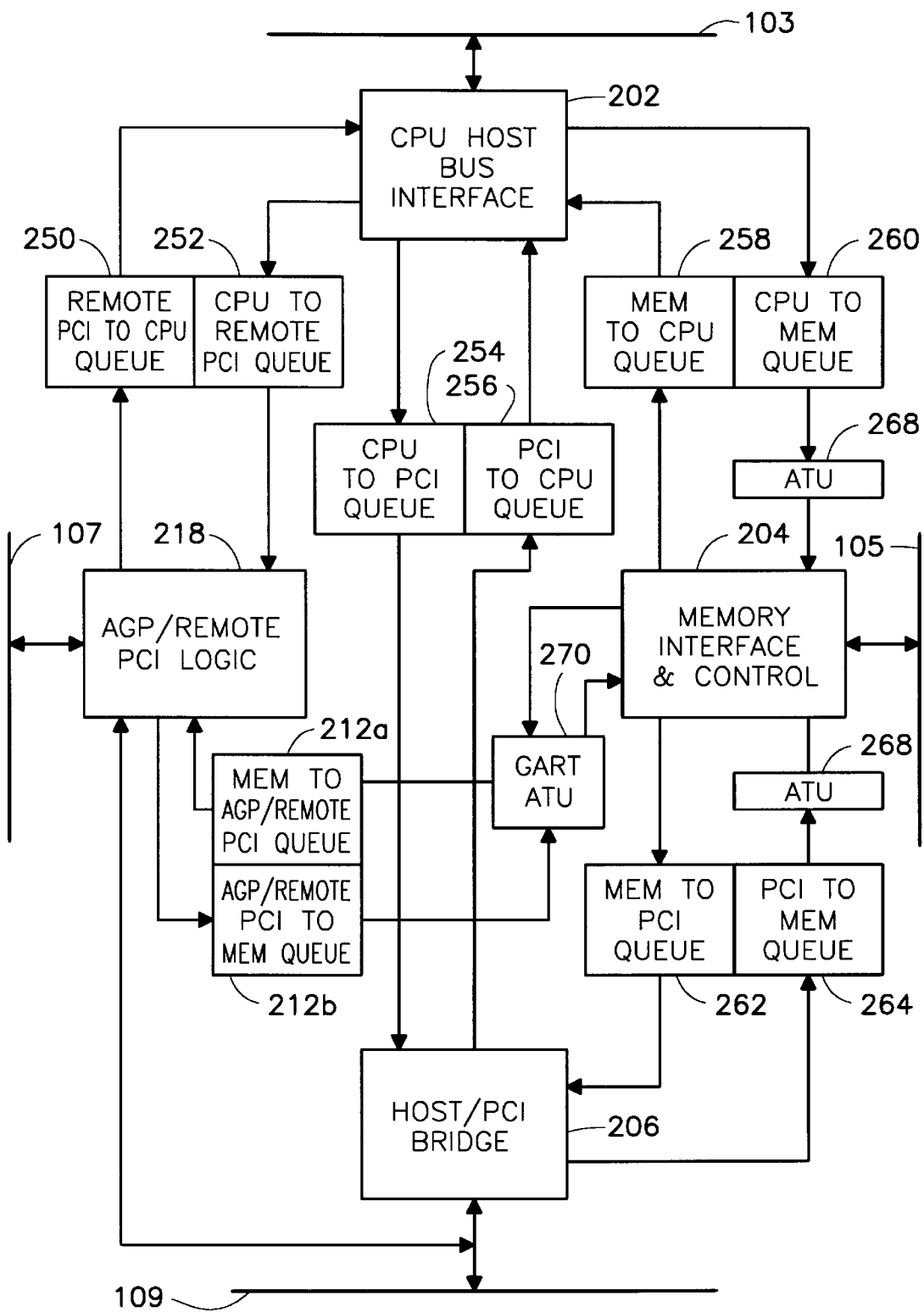
FIG. 6 is a data flow block diagram of FIG. 5.

Referring now to FIG. 6, a data flow block diagram of the core logic 104 of FIG. 5, according to the present invention, is illustrated. The core logic 104 communicates through the various queues, read registers, and other control signals (not illustrated). Separating the major function blocks (202, 204, 206 and 218) as illustrated and coupling these function blocks together with read and write queues allows for a significant amount of concurrency in the computer system.

There are ten address and data queues illustrated in FIG. 2A. The queues receiving information (address and data) from the CPU are: CPU to memory queue 260, CPU to PCI queue 254, and CPU to PCI queue 252. Data directed to the system memory (RAM 106) has the respective base addresses translated to the system memory address space by address translation units ("ATU") 268.

The queues receiving information directed to the CPU are: memory to CPU queue 258, PCI to CPU queue 256, and PCI to CPU queue 250. Memory to PCI queue 262 receives information from the memory interface and control 204 that is directed to the host/PCI bridge 206. PCI to memory queue 264 receives information from the host/PCI bridge 206 that is directed to the memory interface and control 204. Memory to AGP/PCI queue 212a receives information from the memory interface and control 204 that is directed to the AGP/PCI logic 218. AGP/PCI to memory queue 212b receives information from the AGP/PCI logic 218 that is directed to the memory interface and control 204. A graphic address remapping table ("GART") ATU 270 translates the AGP texture data addresses to and from the system memory address space. The GART ATU 270 has a memory address table as more fully defined in the AGP specification.

The CPU to memory queue 260 handles CPU 102 posted writes to the RAM 106. The CPU to PCI queue 254 handles CPU 102 writes to the primary PCI bus 109. The CPU to PCI queue 252 handles CPU 102 writes to either an AGP device or a PCI device on the universal AGP/PCI bus 207.

The system memory (RAM 106) reads by the CPU 102 are queued in the memory to CPU queue 258. Reads from the PCI devices on the primary PCI bus 109 are queued in the PCI to CPU queue 256. Reads from the AGP device or PCI device(s) on the universal AGP/PCI bus 207 are queued in the PCI to CPU queue 250. With the queues 212a, 212b, 250, 252, the AGP/PCI logic 218 has the same capabilities as the host to PCI bridge 206 when configured as an additional host to PCI bridge.

Figure 8:
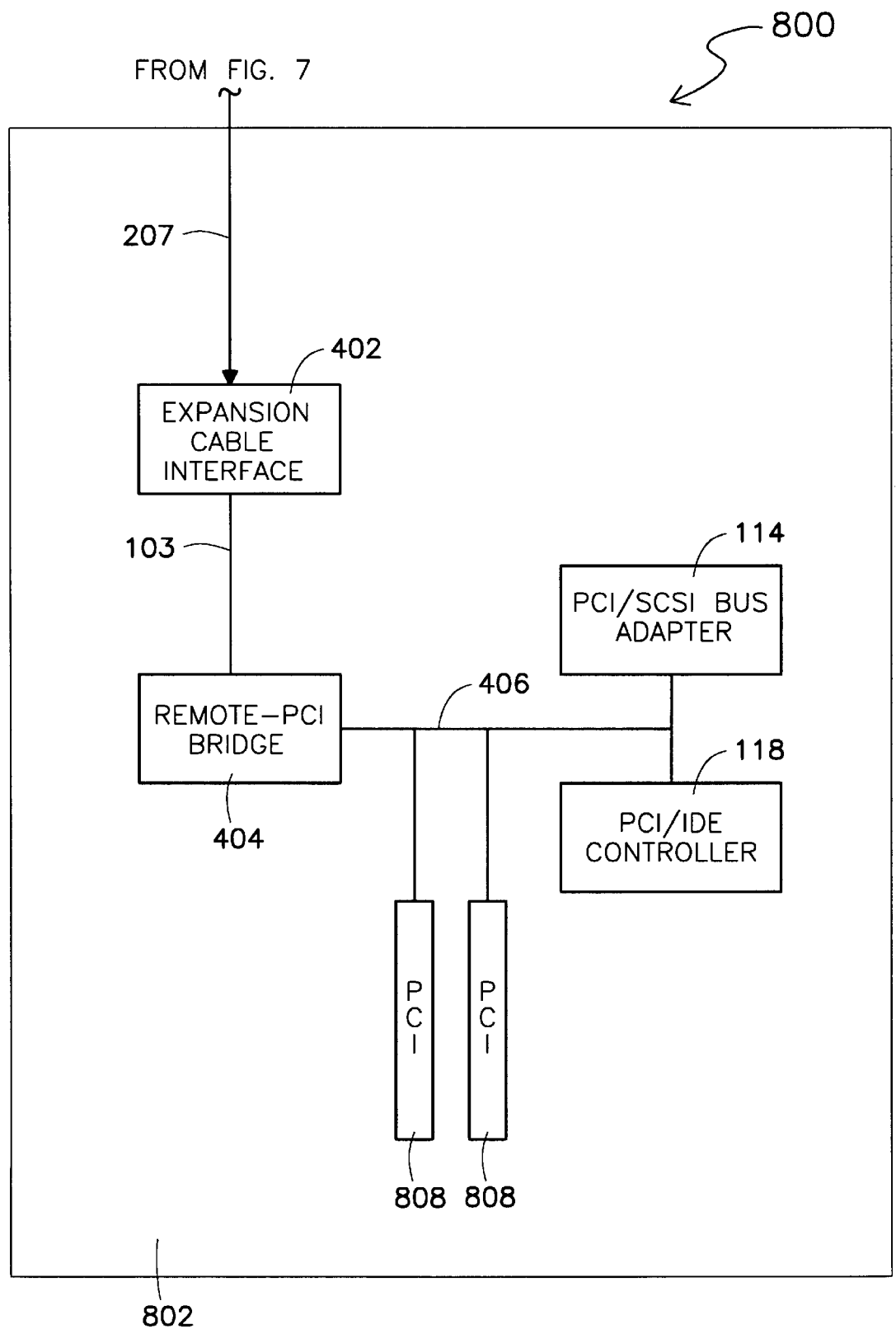
FIG. 8 is schematic plan view of an expansion box motherboard, according to the present invention.

Referring to FIGS. 7 and 8, schematic block diagrams of a computer system motherboard and an expansion box motherboard, respectively, are illustrated in plan views. The computer system motherboard 700 comprises printed circuit board 702 and the expansion box motherboard 800 comprises printed circuit board 802 on which components and connectors are mounted thereto. The printed circuit boards 702, 802 comprise conductive printed wiring which is used to interconnect the components and connectors thereon. The conductive printed wiring (illustrated as buses 103, 105, 107, 109 and 406) may be arranged into signal buses having controlled impedance characteristics. On the printed circuit board 702 are the core logic 104, CPU(s) 102, RAM 106, PCI/ISA/EISA bridge 116, ISA/EISA connectors 706, PCI connectors 708 (primary PCI bus 109), and additional PCI connectors 710a and 710b. The PCI connectors 710 are the same standard PCI connectors as PCI connectors 708. On the printed circuit board 802 are the expansion cable interface 402, remote-PCI bridge 404, PCI/SCSI bus adapter 114, PCI/DE controller 118, and PCI connectors 808 (remote-PCI bus 406). PCI device cards may be plugged into the PCI connectors 808, such as the NIC 122 and the PCI/PCI bridge 124 (see FIG. 4).

The core logic 104 is multiple use, operable as either an AGP interface or an additional PCI interface, and may be configured for either an AGP interface or an additional PCI interface connected to the PCI connectors 710a–710b. Hardware jumper 714 may be utilized to select the core logic 104 interface AGP/PCI personality, or configuration registers within the core logic 104 may be set by software during system configuration or POST after enumerating the various computer system buses to determine what peripheral cards have been connected to the AGP/PCI bus 107. A feature of the present invention allows automatic configuration of the core logic as an AGP interface if an AGP compliant device (not illustrated) is detected on the bus 107 or as an additional PCI interface if a PCI card is detected in the PCI card connectors 710a–710b. The PCI connectors 708 are connected to the computer system primary PCI bus 109 (logical PCI bus number zero). The PCI connectors 708 and 710 are standard PCI connectors as more fully described in the PCI 2.1 Specification.

Figure 9:
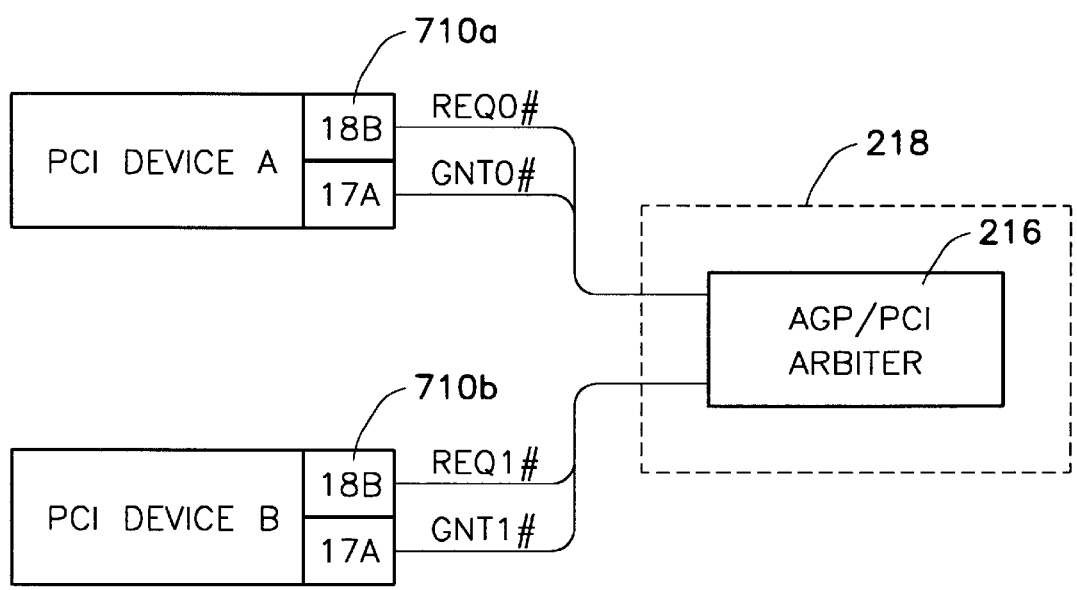
FIG. 9 is a schematic block wiring diagram of a portion of the embodiments of the present invention according to FIGS. 7 and 8.

Referring now to FIG. 9, a schematic block wiring diagram of a portion of the embodiment of the present invention according to FIGS. 7 and 8 is illustrated. Each PCI device card inserted into a PCI connector requires request (REQ#) and grant (GNT#) signals. According to the PCI 2.1 Specification, a PCI device is selected and is allowed to become the PCI bus initiator when it asserts its respective REQ# signal onto the PCI bus and the PCI arbiter acknowledges the PCI device bus initiator request by asserting the respective GNT# signal back to PCI device requesting the PCI bus. In the multiple use core logic 104 of the present invention, a plurality of individual request and grant signal lines are available for either an AGP bus device or additional PCI bus devices. This is partially illustrated by PCI connector 710a connected to REQ0# and GNT0# signal lines and PCI connector 710b connected to REQ1# and GNT1# signal lines, all from the AGP/PCI arbiter 216 of the AGP/PCI logic 218. All other AGP and or PCI connectors and embedded PCI devices each have individual REQ and GNT signal lines connected thereto.

Thus, the multiple use core logic chip set of the present invention may be configured for a computer system having either an AGP compliant bus or an additional PCI bus having remote-PCI bus capabilities, depending only upon the configuration of the computer system printed circuit board 702. In this way one multiple use core logic chip set may be utilized for many differently configured computer systems from simple portable and consumer personal computers to high end workstations and network servers which may require a remote expansion box because of the additional number of peripheral devices required in the computer system.

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A computer system having a core logic chip set configurable for either an accelerated graphics port (AGP) bus or a remote peripheral component interconnect (PCI) bus, said system comprising:

a central processing unit connected to a host bus;

a random access memory connected to a random access memory bus;

a core logic chip set connected to the host bus and the random access memory bus;

said core logic chip set configured as a first interface bridge between the host bus and the random access memory bus, a second interface bridge between the host bus and an accelerated graphics port bus, and a third interface bridge between the random access memory bus and the accelerated graphics port bus;

said core logic chip set configured as a fourth interface bridge between the host bus and a remote peripheral component interconnect bus; and said core logic chip set configured as a fifth interface bridge between the random access memory bus and the remote component interconnect bus.

2. The computer system of claim 1, said computer system further comprising at least one additional central processing unit connected to said host bus.

3. The computer system of claim 1, wherein the core logic chip set is at least one integrated circuit.

4. The computer system of claim 3, wherein the at least one integrated circuit core logic chip set is at least one application specific integrated circuit.

5. The computer system of claim 3, wherein the at least one integrated circuit core logic chip set is at least one programmable logic array integrated circuit.

6. The computer system of claim 1, further comprising at least one peripheral component interconnect device, the at least one peripheral component interconnect device connected to the remote peripheral component interconnect bus.

7. The computer system of claim 1, wherein said fourth and fifth interface bridges include a cable interface comprising drivers and receivers for interfacing with a plurality of insulated wires in an expansion cable.

8. The computer system of claim 7, wherein the drivers are differential drivers and the receivers are differential receivers.

9. The computer system of claim 8, wherein the plurality of insulated wires in the expansion cable are arranged into a plurality of twisted pairs.

10. The computer system of claim 1, wherein the host bus, random access memory bus, and accelerated graphics port bus are on a first printed circuit board.

11. The computer system of claim 10, wherein the remote peripheral component interconnect bus is on a second printed circuit board.

12. The computer system of claim 11, wherein a second cable interface is on said second printed circuit board and connected to the remote peripheral component interconnect bus.

13. The computer system of claim 1, wherein the fourth and fifth interface bridges of said core logic chip set are configured for the remote peripheral component interconnect bus by an electrical signal sent from a hardwired jumper circuit located on the first printed circuit board.

14. The computer system of claim 1, wherein the fourth and fifth interface bridges of said core logic chip set are configured for the remote peripheral component interconnect bus by software control of said core logic chip set.

15. The computer system of claim 14, wherein the fourth and fifth interface bridges of said core logic chip set are configured for the remote peripheral component interconnect bus when a peripheral component interconnect device is detected on the remote peripheral component interconnect bus.

16. The computer system of claim 15, wherein configuration of said core logic chip set is done during power on self test of the computer system.

17. The computer system of claim 15, wherein configuration of said core logic chip set is done during configuration of the computer system.

18. A computer system having a core logic chip set configurable for either an accelerated graphics port (AGP) bus or a remote peripheral component interconnect (PCI) bus, said system comprising:

a central processing unit connected to a host bus;

a random access memory connected to a random access memory bus;

a core logic chip set connected to the host bus and the random access memory bus;

said core logic chip set configured as a first interface bridge between the host bus and the random access memory bus, a second interface bridge between the host bus and a first peripheral component interconnect bus, and a third interface bridge between the random access memory bus and the first peripheral component interconnect bus;

said core logic chip set configured as a fourth interface bridge between the host bus and a remote peripheral component interconnect bus; and said core logic chip set configured as a fifth interface bridge between the random access memory bus and the remote component interconnect bus;

wherein said fourth and fifth interface bridges include a cable interface comprising drivers and receivers for interfacing with a plurality of insulated wires in an expansion cable.

19. The computer system of claim 18, wherein the drivers are differential drivers and the receivers are differential receivers.

20. The computer system of claim 19, wherein the plurality of insulated wires in the expansion cable are arranged into a plurality of twisted pairs.

21. A computer system having a core logic chip set configurable for either an accelerated graphics port (AGP) bus or a remote peripheral component interconnect (PCI) bus said system comprising:

a central processing unit connected to a host bus;

a random access memory connected to a random access memory bus;

a core logic chip set connected to the host bus and the random access memory bus;

said core logic chip set configured as a first interface bridge between the host bus and the random access memory bus, a second interface bridge between the host bus and a first peripheral component interconnect bus, and a third interface bridge between the random access memory bus and the first peripheral component interconnect bus;

said core logic chip set configured as a fourth interface bridge between the host bus and a remote peripheral component interconnect bus; and said core logic chip set configured as a fifth interface bridge between the random access memory bus and the remote component interconnect bus;

wherein the host bus, random access memory bus and first peripheral component interconnect bus are on a first printed circuit board.

22. The computer system of claim 21, wherein the remote peripheral component interconnect bus is on a second printed circuit board.

23. The computer system of claim 22, wherein a second cable interface is on said second printed circuit board and connected to the remote peripheral component interconnect bus.

24. A computer system having a core logic chip set configurable for either an accelerated graphics port (AGP) bus or a remote peripheral component interconnect (PCI) bus, said system comprising:

a central processing unit connected to a host bus;

a random access memory connected to a random access memory bus;

a core logic chip set connected to the host bus and the random access memory bus;

said core logic chip set configured as a first interface bridge between the host bus and the random access memory bus, a second interface bridge between the host bus and a first peripheral component interconnect bus, and a third interface bridge between the random access memory bus and the first peripheral component interconnect bus;

said core logic chip set configured as a fourth interface bridge between the host bus and a remote peripheral component interconnect bus; and said core logic chip set configured as a fifth interface bridge between the random access memory bus and the remote component interconnect bus;

wherein the fourth and fifth interface bridges of said core logic chip set are configured for the remote peripheral component interconnect bus by an electrical signal sent from a hardwired jumper circuit located on the first printed circuit board.

25. A computer system having a core logic chip set configurable for either an accelerated graphics port (AGP) bus or a remote peripheral component interconnect (PCI) bus, said system comprising:

a central processing unit connected to a host bus;

a random access memory connected to a random access memory bus;

a core logic chip set connected to the host bus and the random access memory bus;

said core logic chip set configured as a first interface bridge between the host bus and the random access memory bus, a second interface bridge between the host bus and a first peripheral component interconnect bus, and a third interface bridge between the random access memory bus and the first peripheral component interconnect bus;

said core logic chip set configured as a fourth interface bridge between the host bus and a remote peripheral component interconnect bus; and said core logic chip set configured as a fifth interface bridge between the random access memory bus and the remote component interconnect bus;

wherein the fourth and fifth interface bridges of said core logic chip set are configured for the remote peripheral component interconnect bus by software control of said core logic chip set.

26. The computer system of claim 25, wherein the fourth and fifth interface bridges of said core logic chip set are configured for the remote peripheral component interconnect bus when a peripheral component interconnect device is detected on the remote peripheral component interconnect bus.

27. The computer system of claim 26, wherein configuration of said core logic chip set is done during power on self test of the computer system.

28. The computer system of claim 26, wherein configuration of said core logic chip set is done during configuration of the computer system.

29. A method, in a computer system, of configuring a core logic chip set for either an accelerated graphics port (AGP)

bus or a remote peripheral component interconnect (PCI) bus, said method comprising the steps of:

providing a central processing unit connected to a host bus;

providing a random access memory connected to a random access memory bus;

providing a core logic chip set connected to the host bus and the random access memory bus;

configuring said core logic chip set as a first interface bridge between the host bus and the random access memory bus, a second interface bridge between the host bus and a first peripheral component interconnect bus, and a third interface bridge between the random access memory bus and the first peripheral component interconnect bus; and configuring said core logic chip set as a fourth interface bridge between the host bus and a remote peripheral component interconnect bus and a fifth interface bridge between the random access memory bus and the remote peripheral component interconnect bus when a configuration signal is applied to said core logic chip set.

30. The method of claim 29, wherein the configuration signal is applied to said core logic chip set when a peripheral component interconnect device is detected on the remote peripheral component interconnect bus.

31. The method of claim 30, wherein the peripheral component interconnect device is detected during a power on self test of the computer system.

32. The method of claim 30, wherein the peripheral component interconnect device is detected during a configuration of the computer system.

33. A core logic chip set configurable for either an accelerated graphics port (AGP) bus or a remote peripheral component interconnect (PCI) bus, comprising:

an accelerated graphics port (AGP) request queue;

an AGP reply queue;

an AGP data and control logic;

an AGP and PCI arbiter;

a PCI data and control logic;

a PCI to PCI bridge; and an expansion cable interface adapted for connection to an expansion cable;

said AGP request and reply queues connected to a memory interface and control logic, said memory and interface control logic adapted for connection to a computer system random access memory;

said AGP data and control logic connected to said memory and interface control logic;

said PCI data and control logic connected to said memory and interface control logic;

said AGP data and control logic and PCI data and control logic connected to a host bus interface, said host bus interface adapted for connection to a computer system host bus having at least one central processing connected thereto;

a host to PCI bus bridge connected to said host bus interface and adapted for connection to a computer system primary PCI bus;

said PCI to PCI bridge connected to said AGP data and control logic, and said PCI data and control logic, wherein said PCI to PCI bridge transfers PCI information transactions between said Host to primary PCI bus bridge and said AGP data and control logic, and said PCI data and control logic;

said AGP data and control logic, said PCI data and control logic, and said AGP and PCI arbiter adapted for connection to either an AGP bus or a PCI bus; and said expansion cable interface connected to said PCI data and control logic.

34. The core logic chip set according to claim 33, wherein said PCI data and control logic, and said AGP and PCI arbiter are adapted for connection to a plurality of PCI devices.

35. The core logic chip set according to claim 33, wherein said PCI data and control logic, and said AGP and PCI arbiter are configured for the plurality of PCI devices by a hardware jumper applying a control signal to said core logic chip set.

36. The core logic chip set according to claim 33, wherein said PCI data and control logic, and said AGP and PCI arbiter are configured for the plurality of PCI devices by software configuring a control register in said core logic chip set.

* * * * *